(12) United States Patent
Dierksmeier (10) Patent No.: US 11,198,499 B2
(45) Date of Patent: Dec. 14, 2021

(54) ADJUSTABLE DOOR SEAL

(71) Applicant: Rolls-Royce North American Technologies Inc., Indianapolis, IN (US)

(72) Inventor: Douglas D. Dierksmeier, Franklin, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 75 days.

(21) Appl. No.: 16/561,791

(22) Filed: Sep. 5, 2019

(65) Prior Publication Data
US 2021/0070417 A1    Mar. 11, 2021

(51) Int. Cl.
| | | |
|---|---|---|
| *B64C 1/14* | (2006.01) | |
| *E06B 7/16* | (2006.01) | |
| *B64D 29/08* | (2006.01) | |

(52) U.S. Cl.
CPC .......... *B64C 1/1461* (2013.01); *B64D 29/08* (2013.01); *E06B 7/16* (2013.01)

(58) Field of Classification Search
CPC .......... B64C 1/1461; B64D 29/08; E06B 7/18
USPC ..................................................... 49/55, 505
See application file for complete search history.

(56) References Cited

U.S. PATENT DOCUMENTS

| | | | | |
|---|---|---|---|---|
| 595,128 | A * | 12/1897 | McArthur | |
| 1,189,790 | A * | 7/1916 | Carroll | E06B 9/52 160/353 |
| 1,345,967 | A * | 7/1920 | Smelser | E06B 7/18 49/318 |
| 1,927,691 | A * | 9/1933 | Pedersen | E06B 7/18 49/320 |
| 3,296,742 | A * | 1/1967 | Radcliffe | F16J 13/18 49/319 |
| 4,805,345 | A | 2/1989 | Ohi | |
| 4,971,369 | A * | 11/1990 | Jean | E05C 19/001 292/36 |
| 5,487,549 | A | 1/1996 | Dalton et al. | |
| 5,642,588 | A | 7/1997 | Sowers | |
| 5,979,828 | A | 11/1999 | Gruensfelder et al. | |
| 6,009,669 | A | 1/2000 | Jardine et al. | |
| 6,059,230 | A | 5/2000 | Leggett et al. | |
| 6,702,232 | B2 | 3/2004 | Dovey et al. | |
| 7,469,502 | B1 * | 12/2008 | Steel | E05C 9/06 49/463 |
| 10,000,271 | B2 | 6/2018 | Poppe et al. | |
| 10,240,390 | B1 * | 3/2019 | Bunyard | E06B 9/02 |
| 10,590,684 | B2 * | 3/2020 | Elizalde Salegui | E05C 19/001 |

(Continued)

*Primary Examiner* — Gregory J Strimbu
(74) *Attorney, Agent, or Firm* — Barnes & Thornburg LLP (57) ABSTRACT

A door panel is included in a nacelle assembly for use with a gas turbine engine to block and allow access selectively to the gas turbine engine. The nacelle assembly includes a nacelle wall, a sleeve, and the door panel. The nacelle wall is arranged at least partway around the gas turbine engine and formed to define an opening that extends through the nacelle wall. The door panel is located in the opening and movable relative to the nacelle wall. The sleeve is coupled with one of the nacelle wall and the door panel and configured to move relative to the nacelle wall or the door panel toward and away from the other of the nacelle wall and door panel to adjust a size of a gap between the door panel and the nacelle wall.

13 Claims, 6 Drawing Sheets

(56) References Cited

U.S. PATENT DOCUMENTS

| 10,767,404 B2* | 9/2020 | Spoelstra | E05D 5/06 |
| 2011/0016797 A1* | 1/2011 | Thielmann | E05C 9/063 |
| | | | 49/484.1 |
| 2015/0121761 A1* | 5/2015 | Lee | E06B 3/5054 |
| | | | 49/316 |

* cited by examiner

ADJUSTABLE DOOR SEAL

FIELD OF THE DISCLOSURE

The present disclosure relates generally to door seals, and more specifically to doors with adjustable seals for use with nacelles and gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines also typically include a nacelle that encases components of the gas turbine engine, such as the compressor and turbine. The nacelle may be formed to include openings that provide access to these components and other components of the gas turbine engine. Typically, doors may be installed within the openings in the nacelle to protect the components of the engine and maintain the aerodynamic shape of the nacelle, while also allowing selective access to the components within the gas turbine engine.

SUMMARY

The present disclosure may comprise one or more of the following features and combinations thereof.

A nacelle assembly for use with a gas turbine engine may include a nacelle wall, a door panel, and a sleeve. The nacelle wall may be configured to be arranged at least partway around the gas turbine engine. The nacelle wall may be formed to define an opening that extends through the nacelle wall. The door panel may be coupled with the nacelle wall and configured to move relative to the nacelle wall between an opened position and a closed position. The door panel may be in the open position when at least a portion of the door panel is spaced apart from the nacelle wall to allow access to the opening. The door panel may be in the closed position when the door panel is positioned in the opening to block access to the opening.

In some embodiments, the door panel and the nacelle wall may define a gap between a perimeter edge of the door panel and the nacelle wall when the door panel is in the closed position. The sleeve may be arranged around the door panel and configured to move relative to the door panel toward and away from the nacelle wall to adjust a size of the gap.

In some embodiments, the sleeve may include a U-shaped cover and a cam. The U-shaped cover may be arranged around the perimeter edge of the door panel. The cam may be coupled with the U-shaped cover for movement with the U-shaped cover. The cam may be configured to rotate and engage the door panel to urge the U-shaped cover toward the nacelle wall to reduce a size of the gap.

In some embodiments, the door panel may be formed to include a slot. The slot may extend through the door panel.

In some embodiments, the sleeve may further include a fastener. The fastener may extend through the U-shaped cover and the slot such that the fastener is configured to move in the slot in response to movement of the U-shaped cover relative to the door panel.

In some embodiments, the sleeve further may include a seal. The seal may be coupled with the U-shaped cover for movement with the U-shaped cover. The seal may be configured to engage the nacelle wall to block airflow through the gap.

In some embodiments, the U-shaped cover includes an outer wall, an inner wall, and a join wall. The join wall may extend between and interconnect the outer wall and the inner wall.

In some embodiments, the join wall may be shaped with an indent. The indent may receive a portion of the seal.

In some embodiments, the door panel may be formed to include a cutout. The cutout may extend into the door panel away from the nacelle wall. In some embodiments, the cam may be located in the cutout and located within the U-shaped cover.

In some embodiments, the door panel includes a body and a hinge. The hinge may be coupled with the body and with the nacelle wall.

According to another aspect of the disclosure, a nacelle assembly for use with a gas turbine engine may include a nacelle wall, a door panel, and a sleeve. The nacelle wall may be formed to define an opening that extends through the nacelle wall. The door panel may be positioned in the opening to define a gap between a perimeter edge of the door panel and the nacelle wall. The sleeve may be coupled with one of the nacelle wall and the door panel. The sleeve may be configured to move relative to the nacelle wall or door panel toward and away from the other of the nacelle wall and door panel to adjust a size of the gap.

In some embodiments, the sleeve includes a cover and a cam. The cam may be configured to rotate and urge the cover toward the other of the nacelle wall and door panel.

In some embodiments, the cam may be coupled with the cover for movement therewith. In some embodiments, the cam may be configured to engage the door panel and urge the cover toward the nacelle wall.

In some embodiments, the door panel may be formed to include a cutout. The cutout may extend into the door panel and the cam may be located in the cutout.

In some embodiments, the sleeve may include a cover and a bias member. The bias member may be configured to urge the cover toward the other of the nacelle wall and the door panel.

In some embodiments, the door panel may be formed to include a cutout. The cutout may extend into the door panel and the bias member may be located in the cutout. In some embodiments, the bias member may be coupled to the cover for movement therewith.

According to another aspect of the present disclosure, a method may include providing a door panel, a sleeve, and a nacelle wall formed to define an opening therethrough, coupling the sleeve with one of the nacelle wall and the door panel, locating the door panel in the opening to close the opening and to define a gap between the nacelle wall and a perimeter edge of the door panel, coupling the door with the nacelle wall for movement therewith, and moving the sleeve toward the other one of the nacelle wall and the door panel. In some embodiments, moving the sleeve may include rotating a cam to cause the cam to engage the door panel and urge the sleeve away from the door panel and toward the nacelle wall.

In some embodiments, the method may further include locating the cam in the sleeve and in a cutout formed in the door panel, inserting fasteners through the sleeve and the door panel, fixing the sleeve with the door panel for movement with the door panel using the fasteners, and urging the sleeve away from the one of the nacelle wall and door panel and toward the other one of the nacelle wall and door panel.

In some embodiments, the sleeve may include a cover and a seal. The method may include engaging the other one of the nacelle wall and the door panel with the seal.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
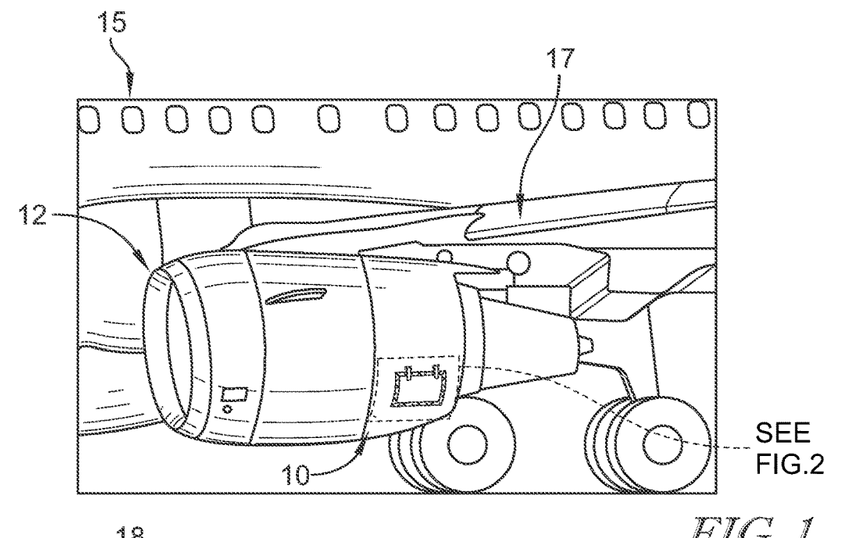
FIG. 1 is a perspective view of a portion of an aircraft showing a gas turbine engine for the aircraft with a nacelle assembly that encases a portion of the gas turbine engine.

A nacelle assembly 10 according to the present disclosure and adapted for use with a gas turbine engine 12 is shown in FIG. 1. The gas turbine engine 12 is mounted to a wing 17 of an aircraft 15. The nacelle assembly 10 encases a portion of the gas turbine engine 12. In other embodiments, the nacelle assembly 10 and gas turbine engine 12 may be supported on a frame above ground or on a sea vessel for use, for example, to generate electricity.

Figures 2, 3:
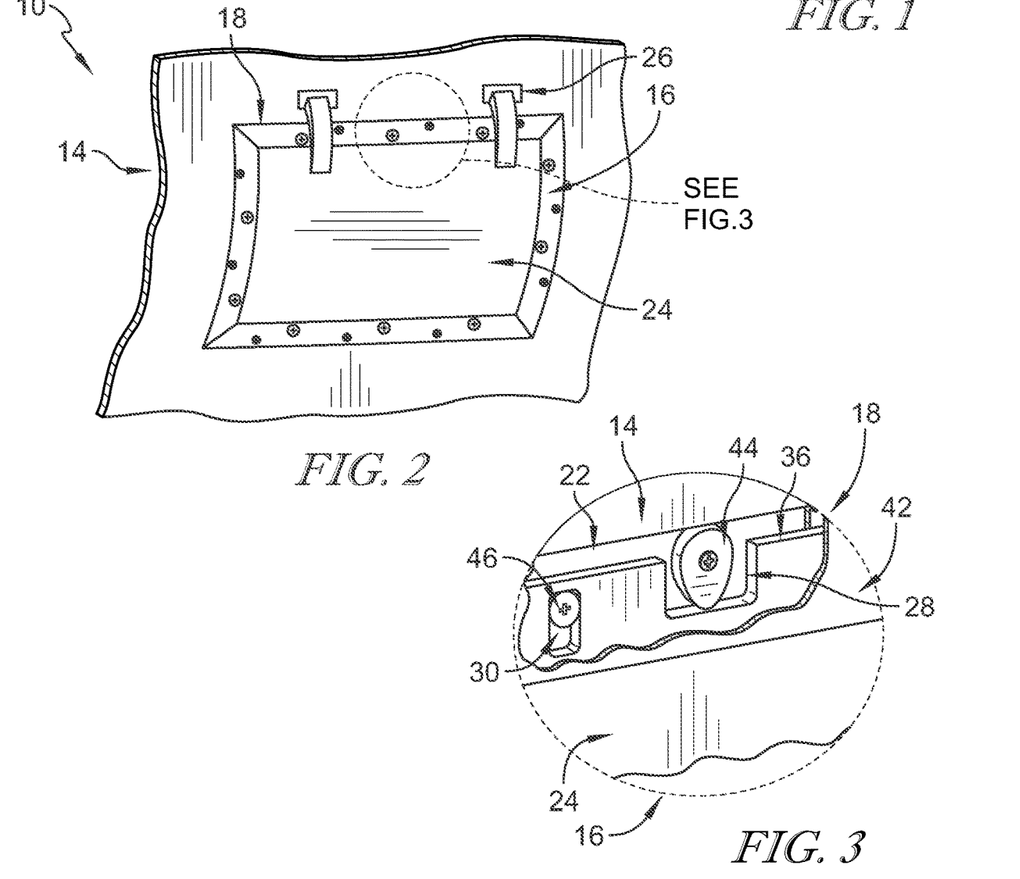
FIG. 2 is a perspective view of the nacelle assembly for the aircraft of FIG. 1 showing the nacelle assembly includes a nacelle wall that encases the portion of the gas turbine engine, a door panel coupled to the nacelle wall that moves between opened and closed positions to allow access to an opening formed in the nacelle wall, and a sleeve arranged around the perimeter of the door panel and configured to move relative to the door panel between a retracted position and an engaged position to seal gaps between the door panel and the nacelle wall when the door panel is in the closed position.
FIG. 3 is a detail view of the nacelle assembly of FIG. 2 with a portion of the sleeve broken away to show the sleeve includes a cover arranged around a perimeter edge of the door panel, a cam coupled to the cover that rotates and engages the door panel to urge the cover toward the nacelle wall, and a fastener that locates and couples the cover to the door panel.

The nacelle assembly 10 includes a nacelle wall 14, a door panel 16, and a sleeve 18 as shown in FIGS. 1-3. The nacelle wall 14 is configured to be arranged at least partway around the gas turbine engine 12. The door panel 16 is coupled with the nacelle wall 14 and is configured to move between an open position and a closed position relative to the nacelle wall 14 to selectively allow access to components of the gas turbine engine 12 through an opening 20 that extends through the nacelle wall 14. The sleeve 18 is arranged around the door panel 16 and configured to move relative to the door panel 16 toward and away from the nacelle wall 14 to adjust a size of a gap 22 between the nacelle wall 14 and the door panel 16 when the door panel 16 is in the closed position. In other embodiments, the sleeve 18 is coupled with the nacelle wall 14 and movable toward and away from the door panel 16.

The door panel 16 is in the open position when at least a portion of the door panel 16 is spaced apart from the nacelle wall 14 to allow access to the opening 20 and, thus, to components of the gas turbine engine 12. The door panel 16 is in the closed position when the door panel 16 is positioned in the opening 20 to block access to the opening 20. In the closed position, the door panel 16 and the nacelle wall 14 define the gap 22 between a perimeter edge 36 of the door panel 16 and the nacelle wall 14. In some embodiments, the gap 22 extends around the entire door panel 16. In other embodiments, the gap 22 extends along only a portion or one side of the door panel 16.

Figure 4:
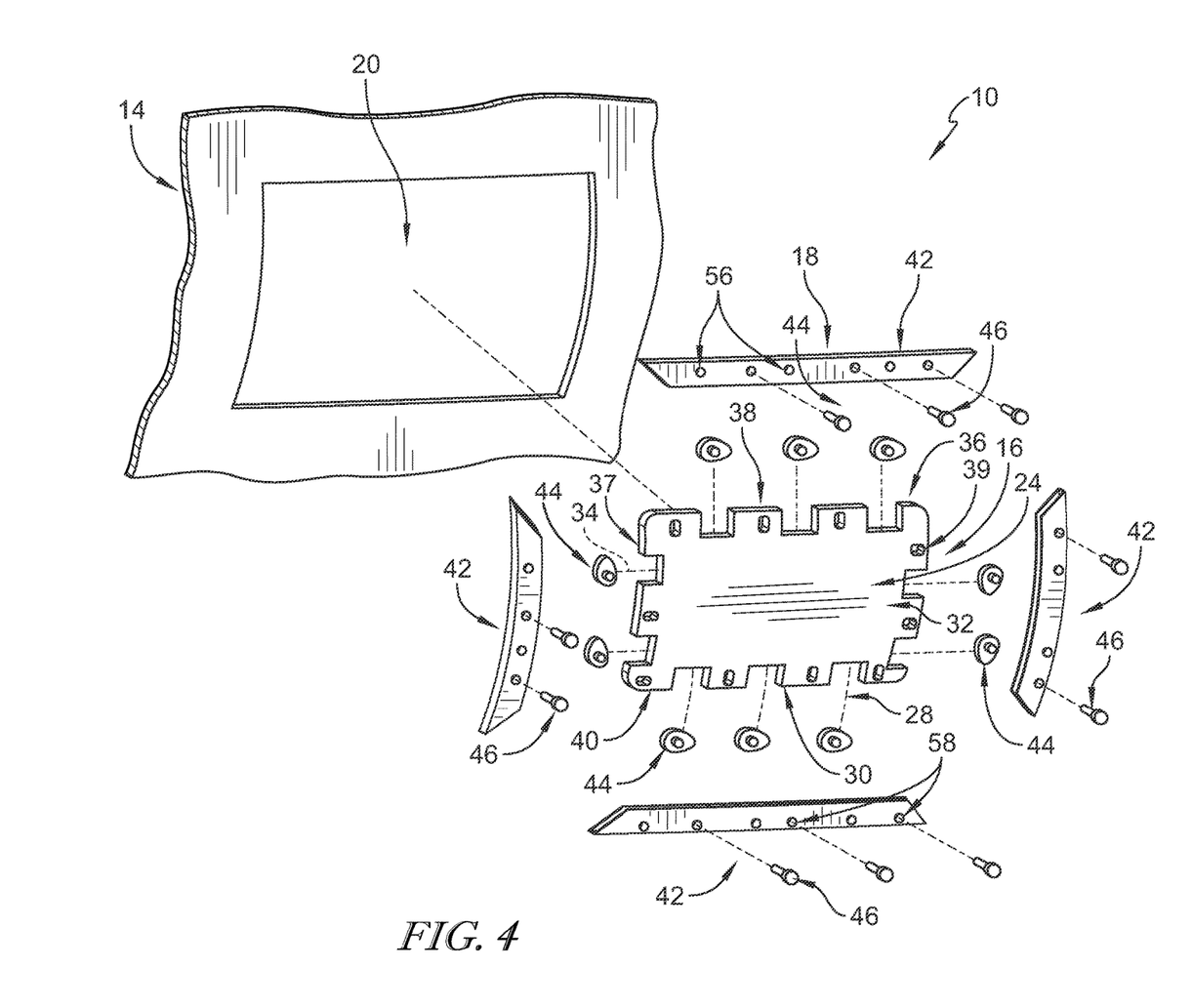
FIG. 4 is an exploded view of the nacelle assembly of FIG. 2 showing the door panel is shaped to include a body, a plurality of cutouts that extend into the body to receive a corresponding cam, and a plurality of slots that extend through the body to receive a corresponding fastener, and further showing the sleeve includes four separate sleeve segments that are assembled onto the corresponding perimeter edge of the door panel.

The door panel 16 includes a body 24, a hinge 26, a plurality of cutouts 28, and a plurality of slots 30 as shown in FIGS. 2-4. The body 24 of the door panel 16 is sized to fit into the opening 20 in the nacelle wall 14. The hinge 26 is coupled with the body 24 and with the nacelle wall 14 and allows the door panel 16 to move between the open and closed positions. In other embodiments, other features may be used to couple the door panel 16 with the nacelle wall 14 rather than the hinge 26 such as, for example, cables, slats, or fasteners. The cutouts 28 extend into the body 24 of the door panel 16 away from the nacelle wall 14. The slots 30 extend through the body 24 of the door panel 16. Each of the cutouts 28 and the slots 30 are sized to receive portions of the sleeve 18.

During installation of the door panel 16 in the opening 20 formed in the nacelle wall 14, the body 24 of the door panel 16 may need to be trimmed at the manufacturing stage to fit into the existing opening 20 in the nacelle wall 14. The customization of the door panel 16 to the nacelle wall 14 increases manufacturing costs and does not allow the door panel 16 to be interchangeable with other aircraft and/or nacelles of the same or different type. In the illustrative embodiment, the sleeve 18 is adjustable so that the door panel 16 fits within the opening 20 of the existing nacelle wall structure 14. The adjustable sleeve 18 allows the door panel 16 to be interchangeable with different aircraft 15 by closing any gaps between the door panel 16 and the nacelle wall 14. As such, a single door panel 16 and sleeve 18 fit a plurality of different sized openings 20.

The body 24 of the door panel 16 includes a first panel surface 32 a second panel surface 34, and the perimeter edge 36 as shown in FIGS. 4-10. The second panel surface 34 is opposite the first panel surface 32 and the perimeter edge 36 extends between the first panel surface 32 and the second panel surface 34. In the illustrative embodiment, the body 24 of the door panel 16 is generally rectangular shaped curved relative to an axis of the nacelle and has four edges 37, 38, 39, 40 that form the perimeter edge 36 of the door panel 16. In other embodiments, the body 24 of the door panel 16 may be another suitable shape.

In the illustrative embodiment, the sleeve 18 comprises four separate sleeve segments 18 that each extend along one of the edges 37, 38, 39, 40 of the door panel 16 to form the rectangular shape. In other embodiments, the sleeve 18 may include a deferent number to segments to fit the door panel shape.

Figure 5:
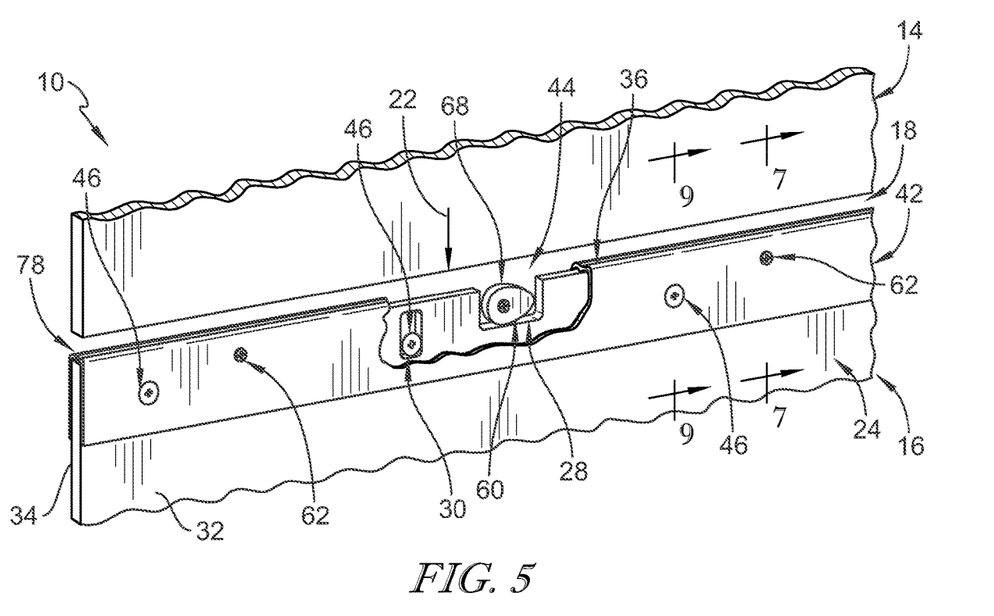
FIG. 5 is a perspective view of a portion of the nacelle assembly of FIG. 2 showing the door panel in the closed position and the sleeve in the retracted position in which the cam is in a first position so that the cover is spaced apart from the nacelle wall to define the gap between the nacelle wall and the door panel.
Figure 6:
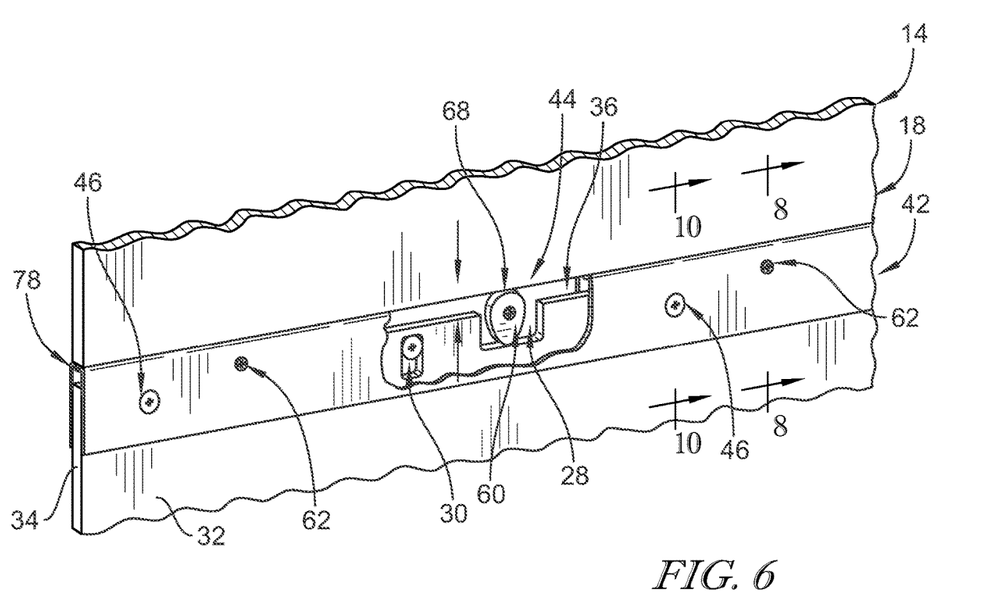
FIG. 6 is a perspective view of a portion of the nacelle assembly of FIG. 2 showing the door panel in the closed position and the sleeve in the engaged position in which the cam has rotated to a second position and engaged the door panel to move the cover toward the nacelle wall and reduce a size of the gap between the nacelle wall and the door panel.

Each sleeve 18 includes a U-shaped cover 42, at least one cam 44, and at least one fastener 46 as shown in FIGS. 3-10. The U-shaped cover 42 is arranged around one of the edges 37, 38 39, 40 that form the perimeter edge 36 of the door panel 16. The cover 42 of adjacent sleeve segments 18 may overlap at the ends so that no gaps are formed in the seal between the sleeve 18 and the nacelle wall 14. The cam 44 is arranged within one of the cutouts 28 in the door panel 16 and is coupled with the U-shaped cover 42 for movement with the cover 42. The cam 44 is configured to rotate between a first position and a second position as shown in FIGS. 5 and 6. The cam 44 is also configured to engage the door panel 16 to urge the cover 42 toward the nacelle wall 14 to reduce the size of the gap 22. Illustratively, the cover 42 fully closes the gap 22. The fastener 46 extends through the cover 42 and the slot 30 such that the fastener 46 is configured to move in the slot 30 in response to movement of the cover 42 relative to the door panel 16.

The sleeve 18 is in the retracted position when the cam 44 is in the first position such that the cover 42 of the sleeve 18 is spaced apart from the nacelle wall 14 with the gap 22 defined between the door panel 16 and the nacelle wall 14 as shown in FIG. 5. The sleeve 18 is in the engaged position when the cam 44 has rotated from the first position to the second position such that the cover 42 of the sleeve 18 engages the nacelle wall 14 and reduces a size of the gap 22 therebetween as shown in FIG. 6. In the illustrative embodiment, the cam 44 is in the second position when the cam 44 has rotated a maximum of 90 degrees from the first position. In other embodiments, the cam 44 may be in the second positon when the cam 44 has rotated less or more than 90 degrees from the first position.

In the illustrative embodiment, two of the sleeves 18 include at least two cams 44 and at least two fasteners 46, while the other two sleeves 18 include at least three cams 44 and at least three fasteners 46 as shown in FIG. 4. In other embodiments, each sleeve 18 may include at least three cams 44 and at least three fasteners 46. In some embodiments, each sleeve 18 may include at least three cams 44 and at least two fasteners 46. In other embodiments, the number of cams 44 and fasteners 46 depends on the shape of the door panel 16.

The U-shaped cover 42 includes an outer wall 48, an inner wall 50, and a join wall 52 as shown in FIGS. 7-10. The outer wall 48 engages the first panel surface 32 of the door panel 16, while the inner wall 50 engages the second panel surface 34 of the door panel 16. The join wall 52 extends between and interconnects the outer wall 48 and the inner wall 50. In the illustrative embodiment, the join wall 52 is shaped with an indent 54 to receive a portion of a seal 78 included in the nacelle assembly 10. The seal 78 may comprise any suitable type of seal including strip seals, rope seals, etc. The seal 78 may be coupled with the join wall 52 for movement therewith such as, for example, by adhesive or mechanical interlocking features.

The outer wall 48 and the inner wall 50 are shaped to include a plurality of cam holes 56, 57 and a plurality of fastener holes 58, 59 as shown in FIGS. 4 and 7-10. The cam holes 56, 57 extend through the outer and inner walls 48, 50 of the cover 42 and are sized to receive a portion of the cam 44 to couple the cam 44 to the cover 42. The fastener holes 58, 59 extend through the outer and inner walls 48, 50 of the cover 42. The fastener holes 58 in the outer wall 48 are sized to receive the fasteners 46 such that the fastener 46 is flush with the outer wall 48. Both the cam holes and fastener holes 56, 57, 58, 59 align with the cutouts 28 and slots 30 in the door panel 16 so the cam 44 and fasteners 46 are arranged in the cutouts 28 and slots 30.

Each cam 44 includes a cam body 60, a first location peg 62, and a second location peg 64 as shown in FIGS. 5-8. The cam body 60 engages the door panel 16 within the cutout 28 to move the sleeve 18 relative the door panel 16. The first location peg 62 extends from the cam body 60 into the hole 56 formed in the outer wall 48. The second location peg 64 extends from the cam body 60 opposite the first location peg 62 into the hole 57 formed in the inner wall 50. The first and second location pegs 62, 64 extend into the respective holes 56, 57 on the outer and inner walls 48, 50 on the sleeve 18 so as to locate the cam 44 relative to the cover 42. The first and second location pegs 62, 64 also define a center of rotation 66 of the cam 44.

In the illustrative embodiment, the cam body 60 is shaped to form a cam profile 68 as shown in FIGS. 5-6. The cam profile 68 is shaped so that in the first position, the cam body 60 fits into the respective cutout 28 and the cover 42 of the sleeve 18 is adjacent the perimeter edge 36 of the door panel 16. The cam profile 68 is also shaped so that as the cam body 60 rotates about the center of rotation, the cam profile 68 engages both the cover 42 and the door panel 16 to move the cover 42 relative to the door panel 16. In the second position, the cam profile 68 is shaped so that the cam body 60 extends out of the cutout 28 and engages both the cover 42 and the door panel 16 to move the sleeve 18 into engagement with the nacelle wall 14.

Figure 7:
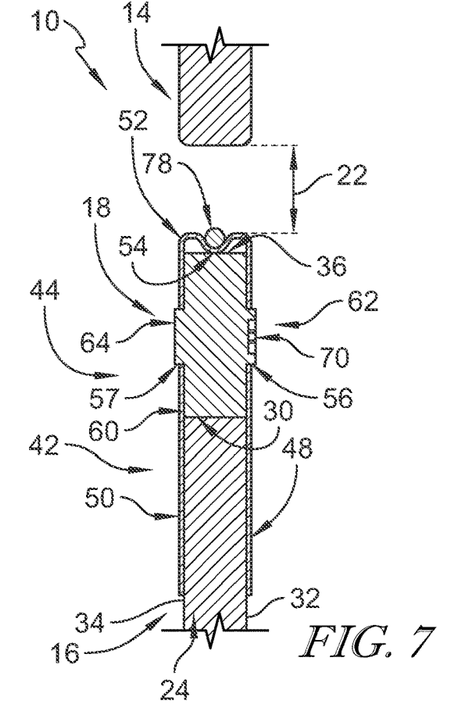
FIG. 7 is a cross-sectional view of the nacelle assembly of FIG. 5 taken along line 7-7 showing the cam arranged in the cutout in the first position so that the sleeve is spaced apart from the nacelle wall.
Figure 8:
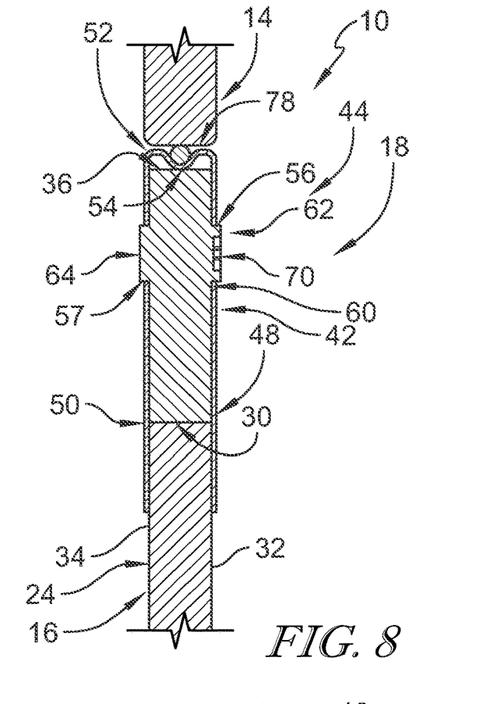
FIG. 8 is a cross-sectional view of the nacelle assembly of FIG. 6 taken along line 8-8 showing the cam arranged in the cutout in the second position so that the sleeve is engaged with the nacelle wall.

The first location peg 62 is shaped to include a drive notch 70 as shown in FIGS. 7 and 8. The drive notch 70 extends into the location peg 62 and is configured to receive a drive mechanism such as a screwdriver. The drive notch 70 allows the drive mechanism to rotate the cam 44 about the center of rotation 66 of the cam 44 between the first and second positions.

Figure 9:
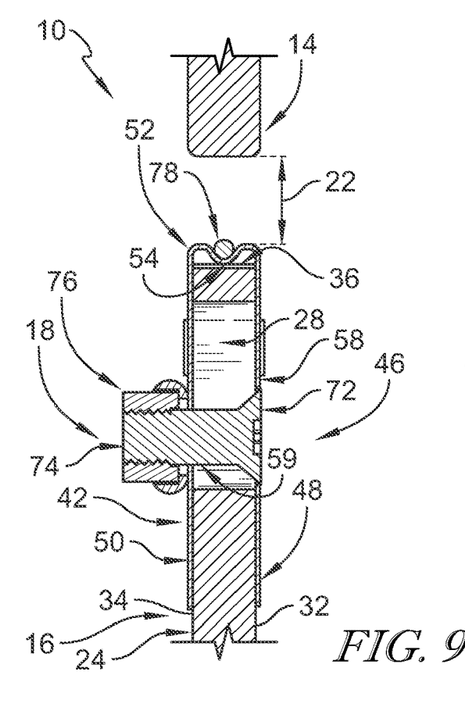
FIG. 9 is a cross-sectional view of the nacelle assembly of FIG. 5 taken along line 9-9 showing the fastener arranged in the slot with the cam in the first positon so that the sleeve is spaced apart from the nacelle wall.
Figure 10:
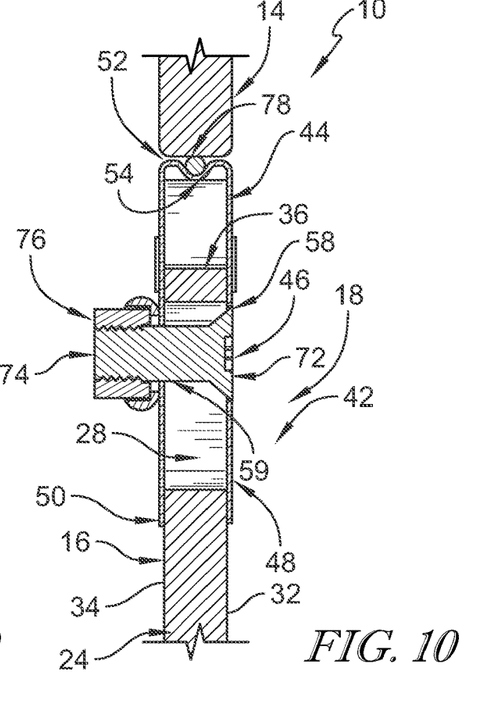
FIG. 10 is a cross-sectional view of the nacelle assembly of FIG. 6 taken along line 10-10 showing the fastener arranged in the slot with the cam in the second position so that the sleeve is engaged with the nacelle wall.
Figure 12:
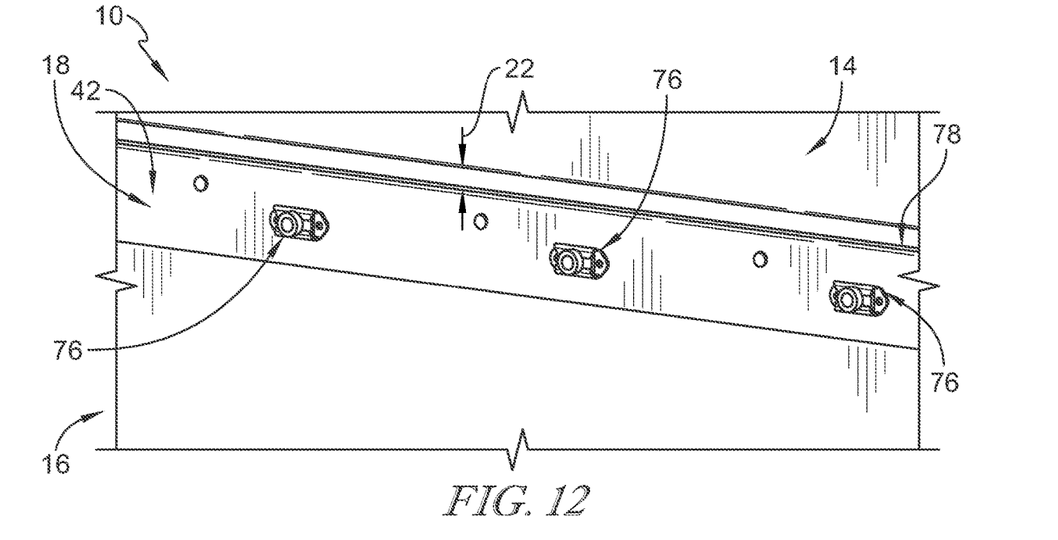
FIG. 12 is a perspective view of the nacelle assembly of FIG. 2 showing the sleeve of the nacelle assembly further includes a plurality of nut plates that are each configured to receive a portion of the corresponding fastener to help secure the cover to the door panel once the sleeve is in the desired position.

Each fastener 46 includes a head 72, a shank 74, and a nut plate 76 as shown in FIGS. 9, 10, and 12. The head 72 is shaped to engage the outer wall 48 of the cover 42 to block movement of the fastener 46 relative to the cover 42. The shank 74 extends from the head 72 through the sleeve 18 and the door panel 16 within the corresponding slot 30 into the nut plate 76 arranged on the opposite side of the door panel 16. The shank 74 extends through the cover 42 and slot 30 into the nut plate 76 to couple the sleeve 18 to the door panel 16 while allowing the fastener 46 to move in the slot 30 in response to movement of the cover 42 relative to the door panel 16.

In the illustrative embodiment, the shank 74 of each fastener 46 is threaded as shown in FIGS. 9 and 10. The shank 74 extends through the cover 42 and the slot 30 in the door panel 16 into the nut plate 76 to secure the cover 42 to the door panel 16. The nut plate 76 allows the fasteners 46 to be tightened so that the outer and inner walls 48, 50 of the sleeve 18 engage the door panel 16 and block further movement of the sleeve 18 relative to the door panel 16. In other embodiments, the threads of the shank 74 engage corresponding mating threads formed in the inner wall 50 of the cover 42 to secure the cover 42 to the door panel 16.

In other embodiments, the fasteners 46 may be integral features that extend from one of the outer wall 48 and the inner wall 50 of the sleeve 18 into the slots 30 formed in the door panel 16. In such an embodiment, the friction from the engagement of the outer and inner walls 48, 50 with the surfaces 32, 34 of the door panel 16 couples the cover 42 to the door panel 16, while the fasteners 46 locate and guide the cover 42 as the cover 42 moves relative to the door panel 16.

In the illustrative embodiment, the sleeve 18 further includes a seal 78 as shown in FIGS. 5-10. The seal 78 is coupled with the U-shaped cover 42 for movement with the U-shaped cover 42. The seal 78 is configured to engage the nacelle wall 14 to block airflow through the gap 22. In the illustrative embodiment, the seal 78 is coupled to the cover 42 in the indent 54 of the cover 42. In the illustrative embodiment, the seal is an elastomer seal. In other embodiments the seal 78 may be another suitable seal type.

A method of reducing a size of the gap 22 between the nacelle wall 14 and the door panel 16 on the gas turbine engine 12 may include several steps. The method includes coupling the sleeve 18 with one of the nacelle wall 14 and the door panel 16, locating the door panel 16 in the opening 20 to close the opening 20 and to define the gap 22 between the nacelle wall 14 and the perimeter edge 36 of the door panel 16, coupling the door panel 16 with the nacelle wall 14 for movement therewith, and moving the sleeve 18 toward the other one of the nacelle wall 14 and the door panel 16. In the illustrative embodiment, the method includes coupling the sleeve 18 with the door panel 16 and moving the sleeve 18 toward the nacelle wall 14.

The coupling the sleeve step includes locating the cam 44 in the cutout 28 formed in the door panel 16 and arranging the cover 42 of the sleeve 18 over the perimeter edge 36 of the door panel 16 so that the locating pegs 62, 64 on the cam 44 extend into the cam holes 56, 57 in the cover 42. The coupling step further includes inserting the fasteners 46 through fastener holes 58, 59 in the cover 42 and the slots 30 in the door panel 16 and fixing the sleeve 18 with the door panel 16 for movement therewith using the fasteners 46.

The moving the sleeve step includes rotating the cam 44 to cause the cam 44 to engage the door panel 16 and urge the sleeve 18 away from the door panel 16 and toward the nacelle wall 14. The method further includes locking the position of the sleeve 18 on the door panel 16 by tightening the fasteners 46 so that the outer and inner walls 48, 50 of the cover 42 engage the door panel 16. The method may further include engaging the nacelle wall 14 with the seal 78.

Figure 11:
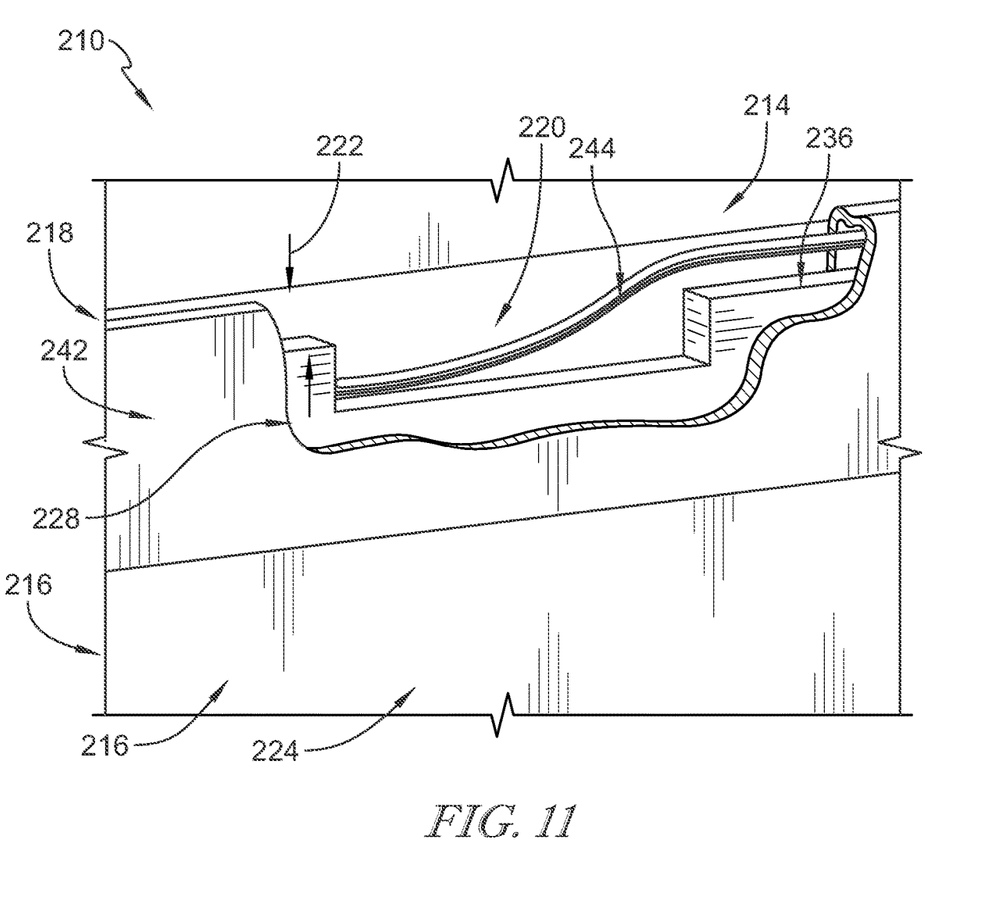
FIG. 11 is perspective view of another embodiment of the nacelle assembly of FIG. 2 showing the nacelle assembly includes a nacelle wall, a door panel coupled to the nacelle wall, and a sleeve with a portion broken away to show the sleeve includes a cover arranged around a perimeter edge of the door panel and a bias member coupled to the cover and engaged with the door panel to urge the cover toward the nacelle wall to reduce a size of a gap between the nacelle wall and the door panel.

Another embodiment of a nacelle assembly 210 in accordance with the present disclosure is shown in FIG. 11. The nacelle assembly 210 is substantially similar to the nacelle assembly 10 shown in FIGS. 1-10 and described herein. Accordingly, similar reference numbers in the 200 series indicate features that are common between the nacelle assembly 10 and the nacelle assembly 210. The description of the nacelle assembly 10 is incorporated by reference to apply to the nacelle assembly 210, except in instances when it conflicts with the specific description and the drawings of the nacelle assembly 210.

The nacelle assembly 210 includes a nacelle wall 214, a door panel 216, and a sleeve 218 as shown in FIG. 11. The nacelle wall 214 is formed to define an opening 220 that extends through the nacelle wall 214. The door panel 216 is positioned in the opening 220 to define a gap 222 between a perimeter edge 236 of the door panel 216 and the nacelle wall 214. The sleeve 218 is coupled with the door panel 216 and configured to move relative to the door panel 216 toward the nacelle wall 214 and away from door panel 216 to adjust a size of the gap 222.

The door panel 216 includes a body 224 and a cutout 228 as shown in FIG. 11. The body 224 of the door panel 216 is sized to fit into the opening 220 in the nacelle wall 214. The cutouts 228 extend into the body 224 of the door panel 216 away from the nacelle wall 14. The cutout 228 is sized to receive portions of the sleeve 218.

The sleeve 218 includes a cover 242 and a bias member 244 as shown in FIG. 11. The U-shaped cover 242 is arranged around an edge of the door panel 216. The bias member 244 is configured to urge the cover 242 toward the nacelle wall 214. Illustratively, the bias member 244 is integrally formed with the cover 242. In this embodiment, a cutout is formed in the cover 242 and then bent to form the bias member 244. In the illustrative embodiment, the bias member 244 is a leaf spring. In other embodiments, the bias member 244 may be another suitable spring type. The bias member 224 may work in tandem with cams like cam 44 or may replace the use of cams 44.

A method of reducing a size of the gap 222 between the nacelle wall 214 and the door panel 216 on the gas turbine engine 12 may include several steps. The method includes coupling the sleeve 218 with one of the nacelle wall 214 and the door panel 216 and locating the door panel 216 in the opening 220 to close the opening 220 and to define the gap 222 between the nacelle wall 214 and the perimeter edge 236 of the door panel 216. The method further includes coupling the door panel 216 with the nacelle wall 214 for movement therewith and releasing the sleeve 218 toward the other one of the nacelle wall 214 and the door panel 216.

The coupling the sleeve 218 step includes arranging the cover 242 of the sleeve 218 over the perimeter edge 236 of the door panel 216 so that the bias member 244 is located in the cutout 228 formed in the door panel 216. The locating the door panel 216 step includes compressing the bias member 244 within the cutout 228 so that the cover 242 of the sleeve 218 is adjacent to the perimeter edge 236 of the door panel 216 and arranging the door panel 216 with the sleeve 218 coupled thereto within the opening 220 in the nacelle wall 214. The releasing step includes decompressing the bias member 244 within the cutout 228 so that the bias member 244 expands and pushes the sleeve 218 into engagement with the nacelle wall 214.

Figure 13:
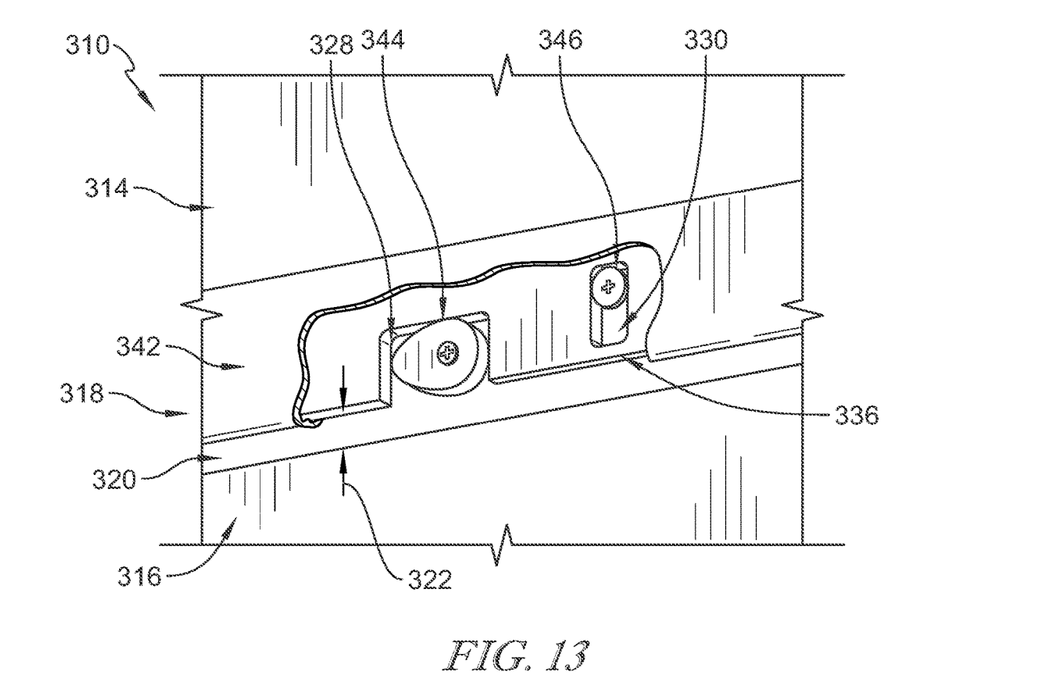
FIG. 13 is perspective view of another embodiment of the nacelle assembly of FIG. 2 showing the nacelle assembly includes a nacelle wall, a door panel arranged in an opening defined by the nacelle wall, and a sleeve arranged around a perimeter of the opening of the nacelle wall and configured to move relative to the nacelle wall between a retracted position and an engaged position to seal gaps between the door panel and the nacelle wall when the door panel is in the closed position.

Another embodiment of a nacelle assembly 310 in accordance with the present disclosure is shown in FIG. 13. The nacelle assembly 310 is substantially similar to the nacelle assembly 10 shown in FIGS. 1-12 and described herein. Accordingly, similar reference numbers in the 300 series indicate features that are common between the nacelle assembly 10 and the nacelle assembly 310. The description of the nacelle assembly 10 is incorporated by reference to apply to the nacelle assembly 310, except in instances when it conflicts with the specific description and the drawings of the nacelle assembly 310.

The nacelle assembly 310 includes a nacelle wall 314, a door panel 316, and a sleeve 318 as show in FIG. 13. The nacelle wall 314 is configured to be arranged at least partway around the gas turbine engine 12. The door panel 316 is coupled with the nacelle wall 314 and is configured to move between an open position and a closed position to selectively allow access to an opening 320 that extends through the nacelle wall 314. The sleeve 318 is arranged around a perimeter edge 336 of the opening 320 formed in the nacelle wall 314. The sleeve 318 is configured to move relative to the nacelle wall 314 toward and away from the door panel 316 to adjust a size of a gap 322 between the nacelle wall 314 and the door panel 316 when the door panel 316 is in the closed position.

The nacelle wall 314 is shaped to include the opening 320, a plurality of cutouts 328, and a plurality of slots 330 as shown in FIG. 13. The opening defines a perimeter edge of the opening 320. The cutouts extend into the perimeter edge of the nacelle wall 314 away from the door panel 316. The slots extend through the nacelle wall 314. Each of the cutouts and the slots are sized to receive portions of the sleeve 318.

The sleeve 318 includes a U-shaped cover 342, a cam 344, and a fastener 346 as shown in FIG. 13. The U-shaped cover 342 is arranged around the perimeter edge 336 of the nacelle wall 314. The cam 344 is arranged within one of the cutouts 328 in the nacelle wall 314 and is coupled with the cover 342 for movement with the cover 342. The cam 344 is configured to rotate and engage the nacelle wall 314 to urge the cover 342 toward the door panel 316 to reduce a size of the gap 322. The fastener 346 extends through the cover 342 and the slot 330 such that the fastener 346 is configured to move in the slot 330 in response to movement of the cover 342 relative to the nacelle wall 314.

A method of closing the gap 322 between the nacelle wall 314 and the door panel 316 on the gas turbine engine 12 may include several steps. The method includes coupling the sleeve 318 with the nacelle wall 314, locating the door panel 316 in the opening 320 to close the opening 320 and to define the gap 322 between the nacelle wall 314 and the perimeter edge 336 of the door panel 316, coupling the door panel 316 with the nacelle wall 314 for movement therewith, and moving the sleeve 318 toward the door panel 316.

The coupling the sleeve 318 step includes locating the cam 344 in the cutout 328 formed in the nacelle wall 314 and arranging the cover 342 of the sleeve 318 over the perimeter edge 336 of the nacelle wall 314 so that the cam 344 is coupled to the cover 342. The coupling step further includes inserting the fasteners 346 through the cover 342 and the slots 330 in the nacelle wall 314 and fixing the sleeve 318 with the nacelle wall 314 for movement therewith using the fasteners 346.

The moving the sleeve 318 step includes rotating the cam 344 to cause the cam 344 to engage the nacelle wall 314 and urge the sleeve 318 away from the nacelle wall 314 and toward the door panel 316. The method further includes locking the position of the sleeve 318 on the nacelle wall 314 by tightening the fasteners 346 so that the walls of the cover 342 engage the nacelle wall 314.

During the installation of different components on a gas turbine engine 12, conventional nacelle doors may be trimmed to fit with the existing aircraft structure 14, 214, 314. This procedure may add expense to the construction of the engine 12 and may not allow the doors to be interchangeable with other aircraft 15. The present disclosure relates to an adjustable sleeve seal 18, 218, 318 that may be used around the perimeter edge 36, 236, 336 of the door panel 16, 216, 316. The sleeve seal 18, 218, 318, as shown in FIGS. 1-10, may include of a sliding sleeve or cover 42, 242, 342, an adjustment cam 44, 344, a hold down bolt 46, 246, 346, a nut plate 76, an optional elastomer sealing member 78, and optionally a bias member.

The door panel 16 may be installed onto the aircraft 15 with the sleeve 18 in the retracted position as shown in FIG. 5. The adjustment cams 44 may be rotated as shown in FIG. 6. The rotation of the cams 44 may move the sleeve 18 to minimize the gap 22 between the sleeve 18 and the aircraft 15 or the nacelle wall 14. The hold down bolts or fasteners 46 may be tightened to lock the sleeve 18 into position.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A nacelle assembly for use with a gas turbine engine, the nacelle assembly comprising a nacelle wall configured to be arranged at least partway around the gas turbine engine, the nacelle wall formed to define an opening that extends through the nacelle wall, a door panel coupled with the nacelle wall and configured to move relative to the nacelle wall between an opened position in which at least a portion of the door panel is spaced apart from the nacelle wall to allow access to the opening and a closed position in which the door panel is positioned in the opening to block access to the opening, whereby the door panel and the nacelle wall define a gap between a perimeter edge of the door panel and the nacelle wall when the door panel is in the closed position, and a sleeve arranged around the door panel and configured to move relative to the door panel toward and away from the nacelle wall to adjust a size of the gap, the sleeve including a U-shaped cover arranged around the perimeter edge of the door panel and a cam coupled with the U-shaped cover for movement with the U-shaped cover, and the cam configured to rotate and engage the door panel to urge the U-shaped cover toward the nacelle wall to reduce the size of the gap, wherein the door panel is formed to include a slot that extends through the door panel and the sleeve further includes a fastener that extends through the U-shaped cover and the slot such that the fastener is configured to move in the slot in response to movement of the U-shaped cover relative to the door panel, wherein the sleeve further includes a seal coupled with the U-shaped cover for movement with the U-shaped cover and configured to engage the nacelle wall to block airflow through the gap, wherein the U-shaped cover includes an outer wall, an inner wall, and a join wall that extends between and interconnects the outer wall and the inner wall and the join wall is shaped with an indent to receive a portion of the seal.

2. The nacelle assembly of claim 1, wherein the door panel is formed to include a cutout that extends into the door panel away from the join wall, the cam is located in the cutout and located within the U-shaped cover.

3. The nacelle assembly of claim 1, wherein the door panel includes a body and a hinge coupled with the body and with the nacelle wall.

4. A nacelle assembly for use with a gas turbine engine, the nacelle assembly comprising a nacelle wall formed to define an opening that extends through the nacelle wall, a door panel positioned in the opening to define a gap between a perimeter edge of the door panel and the nacelle wall, and a sleeve coupled with one of the nacelle wall and the door panel and configured to move relative to the one of the nacelle wall and the door panel toward and away from the other one of the nacelle wall and door panel to adjust a size of the gap, wherein the sleeve includes a cover and a cam located between the cover and the one of the nacelle wall and the door panel, the cam is configured to rotate relative to the cover and urge the cover toward the other one of the nacelle wall and door panel, and the cam is rotatably coupled with the cover for movement with the cover relative to both the nacelle wall and the panel, wherein the cam includes a cam body and a locating peg that extends away from the cam body and into the cover and the locating peg is formed to include a drive notch configured to receive a drive mechanism for rotating the cam.

5. The nacelle assembly of claim 4, wherein the cam is configured to engage the door panel and urge the cover toward the nacelle wall.

6. The nacelle assembly of claim 4, wherein the door panel is formed to include a discrete cutout that extends into the door panel and the cam is located in the discrete cutout.

7. The nacelle assembly of claim 4, wherein the cover is arranged around a perimeter edge of the door panel and the cam is located within the cover and configured to directly engage the cover and the door panel to move the cover relative to the door panel.

8. The nacelle assembly of claim 4, wherein the door panel is formed to include a slot that extends through the door panel and the sleeve further includes a fastener that extends through the cover and the slot such that the fastener is configured to move in the slot in response to movement of the cover relative to the door panel.

9. The nacelle assembly of claim 4, wherein the sleeve includes a seal, the cover includes an outer wall, an inner wall, and a join wall that extends between and interconnects the outer wall and the inner wall, and the join wall is shaped with an indent to receive a portion of the seal.

10. A method comprising providing a door panel, a sleeve having a cover and a cam, and a nacelle wall formed to define an opening therethrough, coupling the sleeve with one of the nacelle wall and the door panel such that the cam is located between the cover and the one of the nacelle wall and the door panel, locating the door panel in the opening to close the opening and to define a gap between the nacelle wall and a perimeter edge of the door panel, coupling the door panel with the nacelle wall for movement relative thereto, and moving the cover toward the other one of the nacelle wall and the door panel to adjust a size of the gap by rotating the cam to cause the cam to directly engage the cover and the one of the nacelle wall and the door panel and urge the cover away from the one of the nacelle wall and the door panel and toward the other one of the nacelle wall and the door panel and the cam is rotatably coupled with the cover for movement with the cover relative to both the nacelle wall and the door panel, wherein the cam includes a cam body and a locating peg that extends away from the cam body and into the cover and the locating peg is formed to include a drive notch configured to receive a drive mechanism for rotating the cam.

11. The method of claim 10, wherein the sleeve is coupled with the door panel and the method further comprises locating the cam in the cover and in a discrete cutout formed in the perimeter edge of the door panel.

12. The method of claim 10, further comprising inserting fasteners through the cover and the door panel and guiding movement of the cover relative to the door panel using the fasteners.

13. The method of claim 10, wherein the sleeve includes a seal and the cover includes an outer wall, an inner wall, and a join wall that extends between and interconnects the outer wall and the inner wall, the join wall is shaped with an indent that receives a portion of the seal, and the method includes engaging the other one of the nacelle wall and the door panel with the seal.

* * * * *